US008280893B1

(12) United States Patent
Pasca et al.

(10) Patent No.: US 8,280,893 B1
(45) Date of Patent: *Oct. 2, 2012

(54) METHODS AND SYSTEMS FOR IDENTIFYING PARAPHRASES FROM AN INDEX OF INFORMATION ITEMS AND ASSOCIATED SENTENCE FRAGMENTS

(75) Inventors: Alexandru Marius Pasca, Sunnyvale, CA (US); Peter Szabolcs Dienes, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/098,669

(22) Filed: May 2, 2011

Related U.S. Application Data

(63) Continuation of application No. 11/087,446, filed on Mar. 23, 2005, now Pat. No. 7,937,396.

(51) Int. Cl.
*G06F 7/00* (2006.01)
*G06F 17/30* (2006.01)
(52) U.S. Cl. ........................... 707/750; 707/753
(58) Field of Classification Search .............. 707/999.03, 707/730, 749–750, 753, 999.05
See application file for complete search history.

(56) References Cited

U.S. PATENT DOCUMENTS

| 5,469,355 | A | 11/1995 | Tsuzuki |
| 5,594,641 | A | 1/1997 | Kaplan et al. |
| 5,675,819 | A | 10/1997 | Schuetze |
| 5,870,706 | A | 2/1999 | Alshawi |
| 5,907,821 | A * | 5/1999 | Kaji et al. .............. 704/4 |
| 5,926,811 | A | 7/1999 | Miller et al. |
| 6,026,388 | A | 2/2000 | Liddy et al. |
| 6,098,033 | A | 8/2000 | Richardson et al. |
| 6,321,191 | B1 * | 11/2001 | Kurahashi .............. 704/8 |
| 6,453,315 | B1 | 9/2002 | Weissman et al. |
| 6,473,729 | B1 * | 10/2002 | Gastaldo et al. .............. 704/4 |
| 6,519,585 | B1 | 2/2003 | Kohli |
| 6,560,608 | B1 | 5/2003 | Tomm et al. |
| 7,013,264 | B2 | 3/2006 | Dolan et al. |
| 7,136,876 | B1 | 11/2006 | Adar et al. |
| 7,412,385 | B2 * | 8/2008 | Brockett et al. .............. 704/245 |
| 7,636,714 | B1 | 12/2009 | Lamping et al. |
| 2003/0004716 | A1 | 1/2003 | Haigh et al. |
| 2003/0105633 | A1 | 6/2003 | Delaunay et al. |
| 2003/0158850 | A1 | 8/2003 | Lawrence et al. |
| 2003/0200198 | A1 | 10/2003 | Chandrasekar et al. |
| 2003/0204400 | A1 | 10/2003 | Marcu et al. |
| 2003/0212666 | A1 | 11/2003 | Basu et al. |
| 2004/0006464 | A1 | 1/2004 | Geppert et al. |
| 2004/0044952 | A1 | 3/2004 | Jiang et al. |
| 2004/0059565 | A1 | 3/2004 | Dehlinger et al. |
| 2004/0064447 | A1 | 4/2004 | Simske et al. |
| 2004/0078190 | A1 | 4/2004 | Fass et al. |
| 2004/0199498 | A1 | 10/2004 | Kapur et al. |

(Continued)

OTHER PUBLICATIONS

U.S. Appl. No. 11/204,922, filed Aug. 2005, Datar et al.

(Continued)

*Primary Examiner* — Cam Truong
(74) *Attorney, Agent, or Firm* — Middleton Reutlinger

(57) ABSTRACT

Methods and systems for identification of paraphrases from an index of information items and associated sentence fragments are described. One method described comprises identifying a pair of sentence fragments each having a same associated information item from an index, wherein the index comprises a plurality of information items and associated sentence fragments, and identifying a paraphrase pair from the pair of sentence fragments.

51 Claims, 4 Drawing Sheets

U.S. PATENT DOCUMENTS

| | | |
|---|---|---|
| 2005/0004799 A1 | 1/2005 | Lyudovyk |
| 2005/0027691 A1 | 2/2005 | Brin et al. |
| 2005/0065774 A1 | 3/2005 | Doganata et al. |
| 2005/0081139 A1 | 4/2005 | Witwer et al. |
| 2005/0125215 A1 | 6/2005 | Wu et al. |
| 2005/0149499 A1 | 7/2005 | Franz et al. |
| 2006/0009965 A1 | 1/2006 | Gao et al. |
| 2006/0015326 A1 | 1/2006 | Mori et al. |
| 2006/0101000 A1 | 5/2006 | Hacigumus et al. |
| 2006/0106595 A1 | 5/2006 | Brockett et al. |
| 2006/0111896 A1 | 5/2006 | Menezes et al. |
| 2006/0218136 A1 | 9/2006 | Surakka et al. |
| 2007/0083359 A1 | 4/2007 | Bender |

OTHER PUBLICATIONS

A. Ibrahim, "Extracting Paraphrases from Aligned Corpora," Massachusetts Institute of Technology Dept. of Electrical Eng. and Computer Science, Submitted to the Department of Electrical Engineering and Computer Science on Aug. 23, 2002, pp. 2-60.

Allan, Khandelwal and Gupta, "Temporal Summaries of News Topics." Proceedings of the 24th ACM Conference on Research and Development in Information Retrieval (SIGIR-01), pp. 10-18, New Orleans, Louisiana, 2001.

B. Dolan et al., "Unsupervised Construction of Large Paraphrase Corpora: Exploiting Massively Parallel News Source," Natural Language Processing Group, Microsoft Research, Proceedings of COLING 2004, Geneva Switzerland, pp. 1-7.

B. G. Stalls et al., "Translating Names and Technical Terms in Arabic Text," Proceedings of the COLING/ACL Workshop on Computational Linguistics, 1998, pp. 1-8.

B. Pang et al., "Syntax-based Alignment of Multiple Translations: Extracting Paraphrases and Generating New Sentences," HLT-NAACL Main Proceedings, 2003, pp. 181-188.

B.J. Kang et al., "Automatic Transliteration and Back-Transliteration by Decision Tree Learning," Department of Computer Science, Proceedings of $2^{nd}$ International Conference on Language Resources and Evaluation, Athens, Greece May-Jun. 2000, pp. 1135-1141.

B.J. Kang et al., "English-Korean Automatic Transliteration/Back-transliteration System and Character Alignment," Department of Computer Science, The $38^{th}$ Annual Meeting of the Association for Computational Linguistics, Oct. 1-Oct. 8, 2000, pp. 1-2.

Barzilay and Lee. "Learning to Paraphrase: An Unsupervised Approach Using Multiple-Sequence Alignment," Proceedings of the 2003 Human Language Technology Conference (HLT—NAACL-03). 2003. pp. 16-23. Edmonton. Canada.

Barzilay and McKeown. "Extracting Paraphrases from a Parallel Corpus," Proceedings of the 39th Annual Meeting of the Association for Computational Linguistics (ACL-01). 2001. pp. 50-57. Toulouse, France.

Brants. "TnT—A Statistical Part-of-Speech Tagger," Proceedings of the 6th Conference on Applied Natural Language Processing (ANLP-00). 2000. pp. 224-231. Saarland University. Seattle WA.

C. Fellbaum. editor. WordNet: An Electrical Lexical Database and Some of its Applications. MIT Press. 1998.

C. Quirk et al., "Dependency Treelet Translation: Syntactically Informed Phrasal SMT," Proceedings of the $43^{rd}$ Annual Meeting of the ACL, Association for Computer Linguistics, Ann Arbor, Jun. 2005, pp. 271-279.

C. Quirk et al., "Monolingual Machine Translation for Paraphrase Generation," Natural Language Processing Group, Processing of the 2004 Conf. on Empirical Methods . . . , 2004, pp. 1-8.

Chieu and Lee. "Query Based Event Extraction Along Timeline," Proceedings of the 27th ACM Conference on Research and Development in Information Retrieval. DSO National Laboratories. Sheffield. United Kingdom, May 2, 2011.

Chinchor and Marsh. "MUC-7 Information Extraction Task Definition Version 5.1" Proceedings of the $7^{th}$ Message Understanding Conference. 1998.

Collins. "Head-Driven Statistical Models for Natural Language Parsing," PhD thesis. University of Pennsylvania. Philadelphia. 1999.

D. Lin et al., "DIRT—Discovery of Inference Rules from Text," University of Alberta, Department of Computing Science, In Proceedings of the ACM SIGKDD Conf. on Knowledge Disc. and Data Mining, 2001, www.cs.ualberta.ca/.about.lindek/minipar.htm, 2001, pp. 323-328.

D. Moldovan, M. Pasca, S. Harabagiu and M. Surdeanu. 2003. "Performance Issues and Error Analysis in an Open-Domain Question Answering System." *ACM Transactions on Information Systems*, vol. 21, No. 2, Apr. 2003, pp. 133-154.

D. Moldovan, S. Harabagiu, M. pasca, R. Mihalcea, R. Girju, R. Goodrun and V. Rus. 2000. "The Structure and Performance of an Open-Domain Question Answering System." In *Proceedings of the Conference of the Association for Computational Linguistics (ACL-2000)*, 563-570. Available online at: http://citeseer.ist.psu.edu/moldovan00structure.html.

D. Yarowsky, "Word-Sense Disambiguation Using Statistical Models of Roget's Categories Trained on Large Corpora," AT&T Bell Laboratories, In Proceedings, Coling—1992, pp. 1-11.

Daniel Worlton, A computational Approach to Paraphraase Recognition, pp. 1-57 (Apr. 22, 2005).

Dolan, Quirk, and Brockett. "Unsupervised Construction of Large Paraphrase Corpora: Exploiting Massively Parallel News Sources," Proceedings of the 20th International Conference on Computational Linguistics. 2004. pp. 350-356. Geneva Switzerland.

E. Brill et al., "Automatically Harvesting *Katakana*—English Term Pairs from Search Engine Query Logs," Microsoft Research, In Proceedings of the Sixth Language Processing Pacific Rim Symposium, NLPRS, 2001, pp. 393-399.

E. K. Ringger et al., "A Fertility Channel Model for Post-Correction of Continuous Speech Recognition," Proceedings of the $4^{th}$ International Conference on Spoken Language Processing (ICSLP'96), Philadelphia, PA. Oct. 1996, pp. 1-4.

Excerpts from Prosecution History of U.S. Appl. No. 11/238,623 between Sep. 27, 2005 filing and present date, including application, Office actions, and responses to Office actions.

Filatova and Hovy. "Assigning Time-Stamps to Event-Clauses," Proceedings of the 39th Annual Meeting of the ACL, 2001. pp. 88-95. Toulouse. France.

Gildea and Jurafsky, "Automatic Labeling of Semantic Roles." Proceedings of the 38th Annual Meeting of the Association of Computational Linguistics (ACL-OO), pp. 512-520. Hong Kong, 2000.

Gonzalo, Verdejo, Chugur, and Cigarran, Indexing with WordNet synsets can improve text retrieval: Proceedings of the 17th International Conference on Computational Linguistics and 36th Annual Meeting of the Association for Computational Linguistics, Workshop on Usage of WordNet in Natural Language Processing Systems, 1998.

Hearst, Automatic Acquisition of Hyponyms from Large Text Corpora: Proceedings of the 14th International Conference on Computational Linguistics, 1992, pp. 539-545, Nantes France.

I. Ounis and M. Pasca. 1997 IEEE. "An Extended Inverted File Approach for Information Retrieval." In *Proceedings of the 1997 International Symposium on Database Engineering & Applications*. pp. 397-402.

I. Ounis and M. Pasca. 1998. "A Promising Retrieval Algorithm for Systems based on the Conceptual Graphs Formalism." In *Proceedings of the 1998 International Symposium on Database Engineering & Applications*. IDEAS 1998.

I. Ounis and M. Pasca. 1998. "Modeling, Indexing and Retrieving Images Using Conceptual Graphs." In *Proceedings of the 9th International Conference on Database and Expert Systems Applications*. Springer-Verlag, London, UK. pp. 226-239.

I. Ounis and M. Pasca. 1998. "RELIEF: Combining expressiveness and rapidity into a single system." In *Proceedings of the 21st Annual International ACM SIGIR Conference on Research and Development in Information Retrieval*, Aug. 24-28, 1998, Melbourne, Australia. SIGIR '98, pp. 266-274.

I. Ounis and M. Pasca. 1999 IEEE. "The Relief Retrieval System." In *Proceedings of 1997 IEEE Knowledge and Data Engineering Exchange Workshop*. Grenoble Cedex France.

J. Col. Zoom inventors and inventions. Enchanted Learning. 2004. www.enchantedlearning.com.

Jacquemin, Klavans, and Tzoukermann, "Expansion of Multi-Word Terms for Indexing and Retrieval Using Morphology and Syntax," Proceedings of the 35th Annual Meeting of the Association for Computational Linguistics, 2000, pp. 24-31, Madrid Spain.

K. Knight et al., "Machine Transliteration," Information Sciences Institute, Proceedings of the $35^{th}$ Annual Meeting of the Association for Computational Linguistics, 1997, pp. 128-135.

K.S. Jeong et al., "Automatic Identification and Back-Transliteration of Foreign Words for Information Retrieval," Information Processing and Management: An International Journal, Oxford, NY, Pergamon Press. 1999, pp. 523-540.

M. Pasca and B. Van Durme. 2007. "What You Seek is What You Get: Extraction of Class Attributes from Query Logs." In *Proceedings of the $20^{th}$ International Joint Conference on Artificial Intelligence (IJCAI-07)*, pp. 2832-2837, Hyderabad, India.

M. Pasca and P. Dienes. 2005. "Aligning Needles in a Haystack: Paraphrase Acquisition Across the Web." R. Dale et al. (Eds.): *IJCNLP 2005, LNAI 3651*, pp. 119-130. Springer-Verlag Berlin Heidelberg.

M. Pasca and S. Harabagiu. SIGIR 2001. "High Performance Question/Answering." In *Proceedings of the 24th annual international ACM SIGIR conference on Research and development in information retrieval table of contents*, New Orleans, Louisiana. pp. 366-374.

M. Pasca, D. Lin, J. Bigham, A. Lifchits and A. Jain. 2006. "Names and Similarities on the Web: Fact Extraction in the Fast Lane." In *Proceedings of the 21st International Conference on Computational Linguistics and 44th Annual Meeting of ACL*, Sydney, Jul. 2006. pp. 809-816.

M. Pasca, D. Lin, J. Bigham, A. Lifchits, and A. Jain. 2006. "Organizing and Searching the World Wide Web of Facts—Step One: The One-Million Fact Extraction Challenge." In *Proceedings of the $21^{st}$ National Conference on Artificial Intelligence (AAAI-06)*, pp. 1400-1405, Boston, Massachusetts.

M. Pasca. 2001. "Unveiling Next Generation Search Technologies: Answer Extraction on the Web." 2nd International Conference on Internet Computing (IC-2001), Jun. 2001, Las Vegas, Nevada.

M. Pasca. 2002. "Answer Finding Guided by Question Semantic Constraints." In *Proceedings of the Fifteenth International Florida Artificial Intelligence Research Society Conference*, May 14-16, 2002. Pensacola Beach, Florida.

M. Pasca. 2002. "Processing Definition Questions in an Open-Domain Question Answering System." Supplied by the British Library—"The world's knowledge." AAAI-2002.

M. Pasca. 2003. "Question-Driven Semantic Filters for Answer Retrieval." International Journal of Pattern Recognition and Artificial Intelligence. vol. 17, No. 5 (2003) 741-756. World Scientific Publishing Company.

M. Pasca. 2005. "Mining Paraphrases from Self-anchored Web Sentence Fragments." A. Jorge et al. (Eds.): *PKDD 2005, LNAI 3721*, pp. 193-204. Springer-Verlag Berlin Heidelberg.

M. Pasca. CICLing 2005. "Finding Instance Names and Alternative Glosses on the Web: WordNet Reloaded." A. Gelbukh (Ed.): *CICLing 2005, LNCS 3406*, pp. 280-292. Springer-Verlag Berlin Heidelberg.

M. Pasca. CIKM 2004. "Acquisition of Categorized Named Entities for Web Search." In *Proceedings of the thirteenth ACM international conference on Information and knowledge management*. Washington, D.C. pp. 137-145.

M. Pignataro, M. Pasca, and P. Franchin. 2000. "Post-buckling analysis of corrugated panels in the presence of multiple interacting modes." Thin Walled Structures, Elsevier Science Ltd., vol. 36, pp. 47-66.

M. Remy, Wikipedia: The Free Encyclopedia Online, Information Review, 26 (6); 434, 2002.

Mani and Wilson, Robust Temporal Processing of News: Proceedings of the 38th Annual Meeting of the Association of Computational Linguistics, 2000, pp. 69-76, Hong Kong.

Mitra, Singhal, and Buckley, Improving Automatic Query Expansion: Proceedings of the 21st ACM Conference on Research and Development in Information Retrieval, 1998, pp. 206-214, Melbourne Australia.

P. Brown et al., "The Mathematics of Statistical Machine Translation: Parameter Estimation", Association for Computation Linguistics, vol. 19, No. 2, Jun. 1993, pp. 263-311.

P. Virga et al., "Transliteration of Proper Names in Cross-Lingual Information Retrieval," John Hopkins University, Proceedings of the ACL Workshop on Multi-lingual Named Entity Recognition 2003, pp. 1-8.

Phillips and Riloff, Exploiting Strong Syntactic Heuristics and Co-Training to Learn Semantic Lexicons: Proceedings of the Zconference on Empirical Methods in Natural Language Processing, 2002, pp. 125-132, Philadelphia, Pennsylvania.

Pustejovsky, Gaizauskas, and Katz, TimeML: Robust Specification of Event and Temporal Expressions in Text: Proceedings of the 5th International Workshop on Computational Semantics, 2003, Tilburg Netherlands.

R. Barzilay et al., "Extracting Paraphrases from a Parallel Corpus," Computer Science Dept., Annual Mtg. Assoc. for Computational Linguistics, 2001, pp. 1-8.

R. Barzilay et al., "Learning to Paraphrase: An Unsupervised Approach Using Multiple-Sequence Alignment," Proceedings of HLT-HAACL 2003, Main Papers, Edmonton, May-Jun. 2003, pp. 16-23.

R. Bunescu and M. Pasca. 2006. "Using Encyclopedic Knowledge for Named Entity Disambiguation." In *Proceedings of the 11th Conference of the European Chapter of the Association for Computational Linguistics (EACL-06)*, Trento, Italy.

Ravichandran and Hovy, "Learning Surface Text Patterns for a Question Answering System" Proceedings of the 40th Annual Meetings of the Association of Computational Linguistics, 2002, Pennsylvania.

S. Harabagiu and M. Pasca. 1999. "Integrating Symbolic and Statistical Methods for Prepositional Phrase Attachment." In Proceedings of the Twelfth International Florida AI Research Society Conference. Orlando, Florida May 3-5, 1999. AAAI Press. National Language Processing.

S. Harabagiu and M. Pasca. 2000. "Mining Textual Answers with Knowledge-Based Indicators." In *Proceedings of FLAIRS-2000*, May 2000, Orlando FL, pp. 214-218.

S. Harabagiu, D. Moldovan, M. Pasca, M. Surdeanu, R. Mihalcea, R. Girju, V. Rus, F. Lacatusu, P. Morarescu and R. Bunescu. 2001. "Answering complex, list and context questions with LCC's Question-Answering Server." In *Proceedings of the Tenth Text Retrieval Conference (TREC-10)*, Gaithersburg, Maryland, Nov. 13-16, 2001.

S. Harabagiu, D. Moldovan, M. Pasca, R. Mihalcea, M. Surdeanu, R. Bunescu, R. Girju, V. Rus, and P. Morarescu. 2000. "FALCON: Boosting Knowledge for Answer Engines." In the *Proceedings of Text Retrieval Conference (TREC-9)*, 2000. Gaithersburg, Maryland.

S. Harabagiu, D. Moldovan, M. Pasca, R. Mihalcea, M. Surdeanu, R. Bunescu, R. Girju, V. Rus, and P. Morarescu. 2001. "The Role of Lexico-Semantic Feedback in Open-Domain Textual Question-Answering." In *Proceedings of the 39th Annual Meeting on Association for Computational Linguistics*, Toulouse, France. pp. 282-289.

S. Harabagiu, M. Pasca and S. Maiorano. 2000. "Experiments with Open-Domain Textual Question Answering." In Proceedings of the COLING-2000, Association for Computational Linguistics/Morgan Kaufmann, Aug. 2000. Saarbruken, Germany.

S. Harabagiu, M. Pasca and S. Maiorano. 2001. "A Knowledge-Based Answer Engine for Open-Domain Questions." *International Journal on Artificial Intelligence Tools*, vol. 10, Nos. 1&2, 199-224. World Scientific Publishing Company.

S. Harabagiu, M. Pasca and V. Lacatusu. 2001. "Dialogue Management for Interactive Question Answering." In *Proceedings of the Fourteenth International Florida Artificial Intelligence Research Society Conference*, Key West, Florida.

S. Harabagiu, S. Maiorano, and M. Pasca. 2003. "Open-Domain Textual Question Answering Techniques." *Natural Language Engineering* 9 (3): 231-267. Cambridge University Press.

Schiffman, Mani, and Concepcion, Producing Biographical Summaries: Combining linguistic Knowledge with Corpus Statistics, Proceedings of the 39th Annual Meeting of the Association for Computational Linguistics, 2001, pp. 450-457, Toulouse France.

Schutze and Pedersen. "Information Retrieval Based on Word Senses," Proceedings of the 4th Annual Smyposium on Document Analysis and Information Retrieval. 1995. pp. 161-175. Xerox Paolo Alto Research Center, CA. USA.

Shinyama, Sekine, and Sudo, Automatic Paraphrase Acquisition from News Articles: Proceedings of the Human Language Technology Conferences, 2002, pp. 40-46, San Diego, California.

W. Gale et al., "A Program for Aligning Sentences in Bilingual Corpora," Computational Linguistics, 1994, pp. 1-30.

Y. Al-Onaizan et al., "Machine Transliteration of Names in Arabic Text," Proceedings of ACL Workshop on Computational Approaches to Semitic Languages, 2002, pp. 1-14.

Y. Al-Onaizan et al., "Translating Named Entities Using Monolingual and Bilingual Resources," Information Sciences Institute, Proceedings of the 40$^{th}$ Annual Meeting of the Association for Computational Linguistics (ACL), Philadelphia, PA, Jul. 2002, pp. 400-408.

Y. Chiaramella, P. Mulhern, M. Mechkour, I. Ounis, M. Pasca. 1998. "Towards a Fast Precision-Oriented Image Retrieval System." In *Proceedings of the 21st Annual International ACM SIGIR Conference on Research and Development in Information Retrieval*, Aug. 24-28, 1998, Melbourne, Australia. SIGR '98.

Y. Shinyama et al., "Automatic Paraphrase Acquisition from News Articles," Department of Computer Science, NY University, Proceedings of Human Language Technology Conference 2002, pp. 40-46.

Y.Y. Wang et al., "Decoding Algorithm in Statistical Machine Translation," Proceedings of 35$^{th}$ Annual Meeting of the Association of Computational Linguistics, 1997, pp. 1-7.

Zukerman and Raskutii, "Lexical Query Paraphrasing for Document Retrieval," Proceedings of the 19$^{th}$ International Conference on Computational Linguistics, 2002, pp. 1177-1183, Taipei, Taiwan.

\* cited by examiner

| Information Item | Sentence Fragment |
|---|---|
| 1989 | Soviet troops pulled out of Afghanistan |
| 1989 | Soviet troops withdrew from Afghanistan |
| 1989 | the Berlin Wall fell paving the way for a unified Germany |
| ... | |
| Afghanistan | Soviet troops pulled out of the country in 1989 |
| Afghanistan | Soviet troops withdrew from the country in 1989 |
| Afghanistan | Located in Southern Asia, north and west of Pakistan, east of Iran |
| Afghanistan | Hamid Karzai was elected President |
| Afghanistan | Hamid Karzai became President |

FIG. 4

| Rank | Paraphrase | Paraphrase |
|---|---|---|
| 1 | passed | enacted |
| 2 | statistics | figures |
| 3 | figures | data |
| 4 | passed | approved |
| 5 | was elected | became |
| 6 | United States | US |
| 7 | took | came into |
| 8 | over | more than |
| 9 | pulled out of | withdrew from |
| 10 | joined | became a member of |

FIG. 5

METHODS AND SYSTEMS FOR IDENTIFYING PARAPHRASES FROM AN INDEX OF INFORMATION ITEMS AND ASSOCIATED SENTENCE FRAGMENTS

CROSS-REFERENCE TO RELATED APPLICATIONS

This application is a continuation application of and claims priority to U.S. application Ser. No. 11/087,446, filed on Mar. 23, 2005, now U.S. Pat. No. 7,937,396, the contents of which are incorporated herein by reference.

FIELD OF THE INVENTION

The present invention relates generally to information extraction and, more particularly, to methods and systems for identifying paraphrases from an index of information items and associated sentence fragments.

BACKGROUND OF THE INVENTION

Different words and phrases can be used in documents and search queries that have the same or similar meaning. Such words and phases can be referred to as paraphrases. Identified or known paraphrases can be useful in document summarization, information retrieval, and information extraction. Conventional methods for identifying paraphrases include compiling potential paraphrases by a user or users and then mining text to determine if the potential paraphrases are actual paraphrases. Such methods are time consuming and rely on users to compile the initial list of potential paraphrases.

SUMMARY

Embodiments of the present invention comprise methods and systems for identifying paraphrases from an index of information items and associated sentence fragments. One aspect of one embodiment of the present invention comprises identifying a pair of sentence fragments. The sentence fragments may each be related to the same information item, such as a date or entity name. The sentence fragments may be identified from an index that comprises a plurality of information items and associated sentence fragments. A paraphrase pair is identified from the pair of sentence fragments.

This illustrative embodiment is mentioned not to limit or define the invention, but to provide one example to aid understanding thereof. Illustrative embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein:

FIG. 4 shows an illustrative index of information item—sentence fragment pairs according to one embodiment of the present invention; and FIG. 5 shows an illustrative paraphrase index according to one embodiment of the present invention.

DETAILED DESCRIPTION

Introduction

Figure 1:
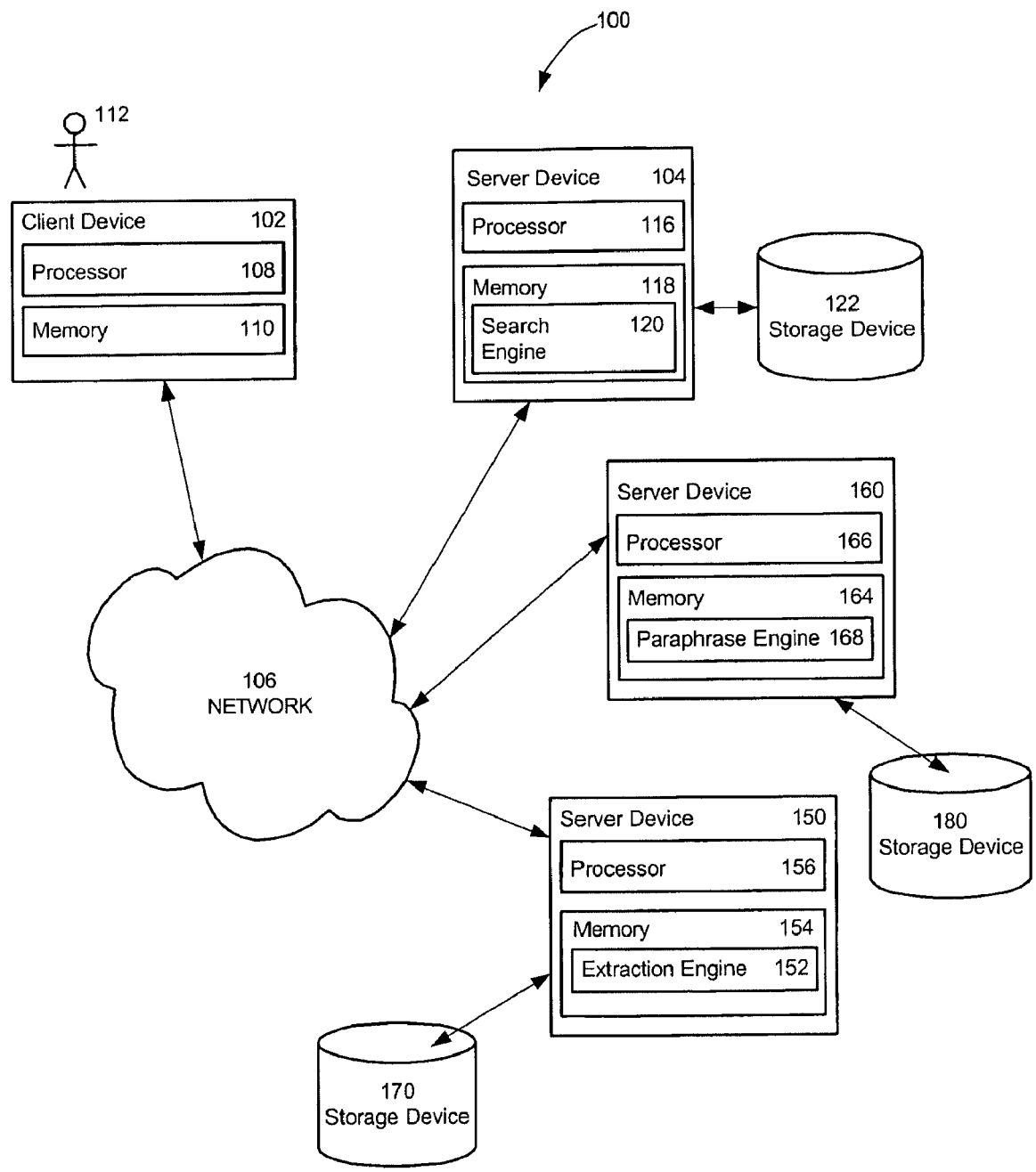
FIG. 1 shows a diagram of a system in accordance with one embodiment of the present invention.

Embodiments of the present invention comprise methods and systems for identifying paraphrases from an index of information items and associated sentence fragments. There are multiple embodiments of the present invention. By way of introduction and example, one illustrative embodiment of the present invention provides a method for utilizing an index of information items (such as dates and entity names) and associated sentence fragments to identify paraphrases.

In one such method, the index includes a number of information items, such as dates, entity names, or concepts, and each information item in the index has an associated sentence fragment. The index may be created by extracting information items and associated sentence fragments from documents indexed by a search engine. An entry in the index can include an information item, such as a date, "1989", and an associated sentence fragment, "Soviet troops pulled out of Afghanistan." The date may be a date in close proximity to the associated sentence fragment in a document or a date determined to be associated with the sentence fragment in another suitable manner. The method utilizes the index to identify paraphrases.

For example, the index can include multiple entries, such as the following two entries: "1989—Soviet troops pulled out of Afghanistan" and "1989—Soviet troops withdrew from Afghanistan." As shown, each entry contains an information item (date) and an associated sentence fragment. The method aligns pairs of sentence fragments associated with the same information item to identify paraphrase pairs. For the two entries above, for example, an alignment of the two sentence fragments leads to the identification of the paraphrase pair "pulled out of" and "withdrew from." Various alignment methods and rules can be used to identify paraphrase pairs. Multiple paraphrase pairs can be identified using the index and the paraphrase pairs can be ranked based on the frequency in which the paraphrase pair occurs. Paraphrase pairs occurring less than a threshold number of times can be discarded. An index of paraphrase pairs can be created and used in the summarization of documents, web search, and information extraction.

An information item, as used herein, may include a date, a name, such as of a person, place, or entity, and a concept. A sentence fragment, as used herein, may include a syntactic clause containing factual information. A sentence fragment may or may not be part of or associated with a complete sentence. A document, as used herein, may include web pages of various formats, such as HTML, XML, and XHTML, Portable Document Format (PDF) files, electronic mail messages, instant messenger messages, and word processor, database, and application program document files, audio, video, or any other documents or information of any suitable type whatsoever made available on a network, a personal computer, or other computing or storage means. The embodiments described herein are described generally in relation to HTML documents, but embodiments may operate on any suitable type of document.

This introduction is given to introduce the reader to the general subject matter of the application. By no means is the invention limited to such subject matter. Illustrative embodiments are described below.

System Architecture

Various systems in accordance with the present invention may be constructed. FIG. 1 is a diagram showing an illustrative system in which illustrative embodiments of the present invention may operate. The present invention may operate, and be embodied in, other systems as well.

Referring now to the drawings in which like numerals indicate like elements throughout the several figures, FIG. 1 is a diagram showing an illustrative environment for implementation of an embodiment of the present invention. The system 100 shown in FIG. 1 comprises a client device 102 in communication with a server device 104 via a network 106. FIG. 1 also shows a server device 160 in communication with a server device 150 over the network 106 and the server device 150 in communication with the server device 104 over the network 106. In one embodiment, the network 106 shown comprises the Internet. The network may also comprise an intranet, a Local Area Network (LAN), a telephone network, or a combination of suitable networks. The client device 102 and server devices 104, 150, and 160 may connect to the network 106 through wired, wireless, or optical connections.

According to the embodiment shown in FIG. 1, the server device 160 can contain a paraphrase engine 168. The paraphrase engine 168 may comprise, for example, software for carrying out or managing the paraphrase-related functions described herein. The paraphrase engine 168 may create a paraphrase index of paraphrase pairs from an information item index. The information item index may be created by an extraction engine 152, which may reside on a server device 150. The extraction engine 152 can create an information item index by extracting information item—sentence fragment pairs from a corpus of documents. In one embodiment, this corpus of documents are documents indexed and stored by a search engine, such as search engine 120 on server device 120. The information item index can also be the result of processing the contents of an existing resource of semi-structured information, such as, for example, an encyclopedia and a dictionary. In the case of an encyclopedia, the information items may be the subjects in the encyclopedia and the sentence fragments may be part of the subjects' associated articles. With dictionaries, the information items may be words and the sentence fragments may be the words' associated definitions.

In one embodiment, the extraction engine 152 and paraphrase engine 168 may reside on a client device, such as client device 102, or may reside in the search engine 120. The paraphrase index may be located on storage device 180 or storage device 122 and may be accessed by search engine 120 and other suitable server and client devices.

Client Devices

Examples of client device 102 are personal computers, digital assistants, personal digital assistants, cellular phones, mobile phones, smart phones, pagers, digital tablets, laptop computers, Internet appliances, and other processor-based devices. In general, a client device 102 may be any suitable type of processor-based platform that is connected to a network 106 and that interacts with one or more application programs. The client device 102 can contain a processor 108 coupled to a computer readable medium, such as memory 110. Client device 102 may operate on any operating system capable of supporting a browser or browser-enabled application, such as Microsoft® Windows® or Linux. The client device 102 is, for example, a personal computer executing a browser application program such as Microsoft Corporation's Internet Explorer™, Netscape Communication Corporation's Netscape Navigator™, Mozilla Organization's Firefox, Apple Computer, Inc.'s Safari™, Opera Software's Opera Web Browser, and the open source Linux Browser. A user 112 can interact with the client device 102 and browser application program to input search queries. The client device 102 can send search queries input by the user 112 to the search engine 120 and receive search result sets from the search engine 120. The client device 102 and browser application program can display the search result sets to the user 112.

Server Devices

The server devices 104, 150, and 160 shown in FIG. 1 each contain a processor 116, 156, and 166 coupled to a computer-readable medium, such as memory 118, 154, and 164. Server devices 104, 150, and 160 also communicate with computer readable medium storage devices 122, 170, and 180, such as magnetic disk storage devices. Server devices 104, 150, and 160, depicted as single computer systems, may be implemented as a network of computer processors. Examples of server devices 104, 150, and 160 are servers, mainframe computers, networked computers, processor-based devices, and similar types of systems and devices. Client processor 108 and server processors 116, 156, 166 can be any of a number of computer processors, as described below, such as processors from Intel Corporation of Santa Clara, Calif. and Motorola Corporation of Schaumburg, Ill.

Such processors may include a microprocessor, an ASIC, and state machines. Such processors include, or may be in communication with computer-readable media (such as memory 118, 154, and 164), which stores program code or instructions (such as the search engine 120, extraction engine 152, and paraphrase engine 168) that, when executed by the processor, cause the processor to perform actions. Embodiments of computer-readable media include, but are not limited to, an electronic, optical, magnetic, or other storage or transmission device capable of providing a processor, such as the processor 166 of server device 160, with computer-readable instructions. Other examples of suitable media include, but are not limited to, a floppy disk, CD-ROM, DVD, magnetic disk, memory chip, ROM, RAM, an ASIC, a configured processor, optical media, magnetic tape media, or any other suitable medium from which a computer processor can read instructions. Also, various other forms of computer-readable media may transmit or carry program code or instructions to a computer, including a router, private or public network, or other transmission device or channel, both wired and wireless. The instructions may comprise program code from any computer-programming language, including, for example, C, C++, C#, Visual Basic, Java, Python, Perl, and JavaScript. Program code running on the server devices 104, 150, and 160 may include web server software, such as the open source Apache Web Server and the Internet Information Server (IIS) from Microsoft Corporation.

Paraphrase Engine

Memory 164 of the server device 160 contains a paraphrase application program, also known as an paraphrase engine 168. The paraphrase engine 168 comprises a software application including program code executable by the processor 166 or a hardware application that is configured to facilitate identifying and extracting paraphrase pairs to create an index of paraphrase pairs. The paraphrase engine 168 may access an information item index containing information item—sentence fragment pairs indexed by the extraction engine 152 to identify and extract paraphrase pairs. In one embodiment, the paraphrase engine 168 aligns pairs of sentence fragments associated with the same information item and extracts potential paraphrase pairs based on an alignment threshold. The potential paraphrase pairs are then indexed if they occur a threshold frequency.

It should be noted that the present invention may comprise systems having different architecture than that which is shown in FIG. 1. For example, in some systems according to the present invention, the paraphrase engine 168 may be contained in the extraction engine 152 or the search engine 120. The system 100 shown in FIG. 1 is merely illustrative, and is used to help explain the illustrative systems and processes discussed below.

Illustrative Process for Creating a Paraphrase Index

Figure 2:
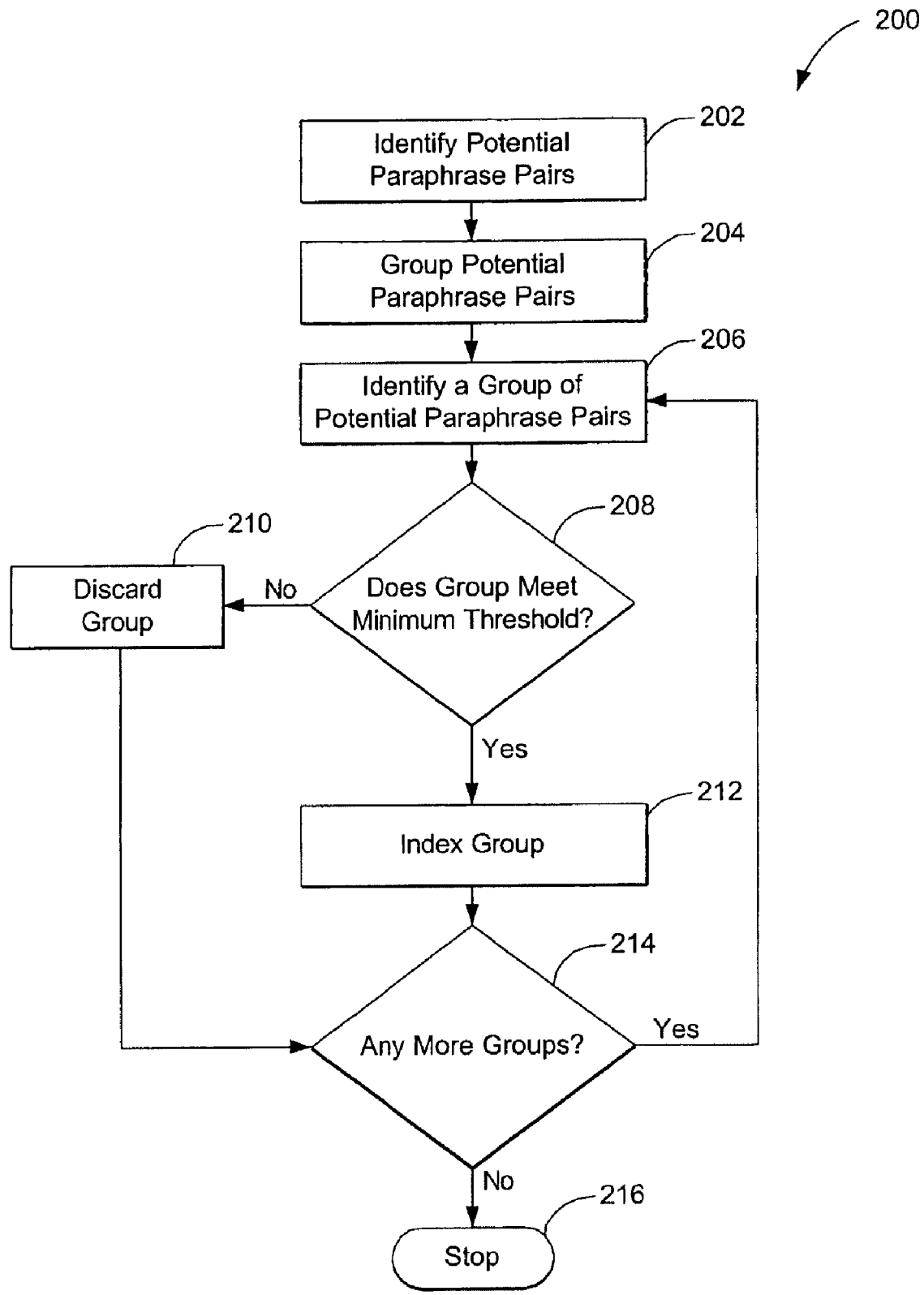
FIG. 2 shows one embodiment of an illustrative method according to one embodiment of the present invention.

Various methods in accordance with embodiments of the present invention may be carried out. FIG. 2 illustrates an illustrative method 200 for identifying paraphrases from an index of information items and associated sentence fragments that may be implemented by the paraphrase engine 168 shown in FIG. 1. This illustrative method is provided by way of example, as there are a variety of ways to carry out methods according to the present invention. The method 200 shown in FIG. 2 can be executed or otherwise performed by one or a combination of various systems. The system shown in FIG. 1 and described above is used for illustration purposes.

The illustrative method 200 begins in block 202 where potential paraphrase pairs are identified. In one embodiment, potential paraphrase pairs are identified by the paraphrase engine 168 from an information item index of information item—sentence fragment pairs. An example of a portion an illustrative information item index is shown in FIG. 4. FIG. 4 illustrates an information item index 400 that includes entries 402. Each entry includes an information item—sentence fragment pair. The extraction engine 152 can create the information item index by accessing documents indexed by the search engine 120 or another corpus of documents to identify and extract information item—sentence fragment pairs.

The extraction engine 152 may use a lightweight extraction method to identify and extract an information item and associated sentence fragment from a document previously indexed by a search engine 120, for example. The extraction method can identify an information item, such as a date, in the text of a document and match a pattern to identify a sentence fragment in close proximity to the date. One or more of a set of lexico-syntactic patterns can be used to identify a sentence fragment associated with the information item. Once identified, the sentence fragment may be filtered to exclude ambiguous or otherwise unhelpful sentence fragments. An identified sentence fragment that is not filtered is extracted with its corresponding information item and the information item—sentence fragment pair is indexed together. The extraction method can be used on all or most of the documents in a corpus of documents to create an index of information item—sentence fragment pairs. The extraction of information item—sentence fragment pairs to create an index is described in U.S. patent application Ser. No. 11/087,447, filed herewith, entitled "Methods and Systems for Extracting an Information Item and Associated Sentence Fragment from a Document," which is incorporated herein in its entirety by reference.

The paraphrase engine 168 may utilize the structure of the information item index to identify potential paraphrase pairs. In one embodiment, the paraphrase engine 168 identifies potential paraphrase pairs by identifying matches of tokens in sentence fragments having like information items.

Figure 3:
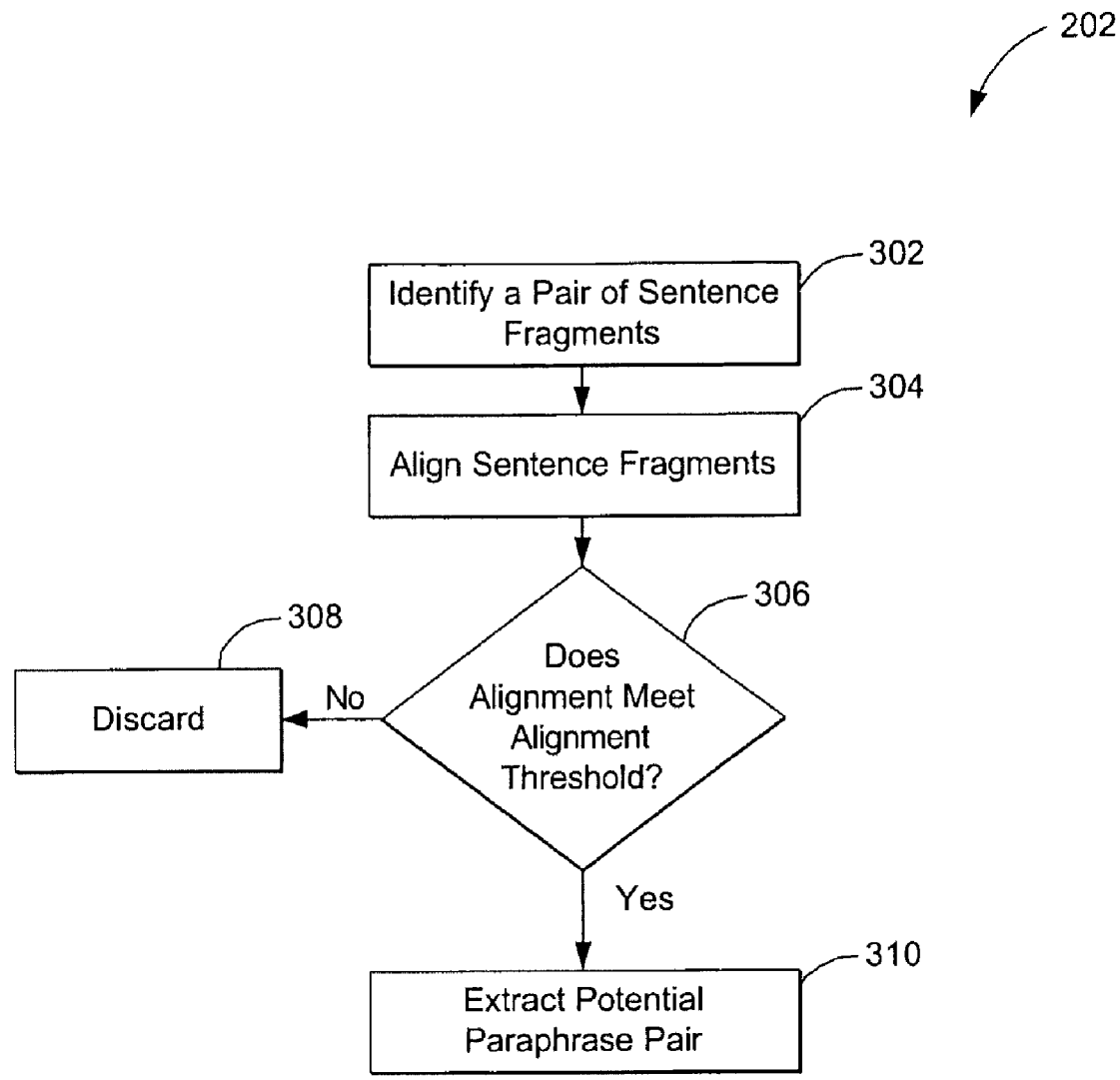
FIG. 3 shows one embodiment of another illustrative method according to one embodiment of the present invention.

FIG. 3 provides an illustrative method for identifying a potential paraphrase pair. Illustrative method 202 shown in FIG. 3 begins in block 302 by identifying a pair of sentence fragments. In one embodiment, the paraphrase processor 168 identifies a pair of sentence fragments from entries in an information item index having the same information item. For example, the extraction processor 168 may identify the sentence fragments 404, 406 from the information item index 400 shown in FIG. 4. The sentence fragments 404, 406 are associated with the same information item—the date 1989.

In block 304, the sentence fragments identified in block 302 are aligned. In one embodiment, the sentence fragments in the information item index have been previously tokenized. Tokenization can include parsing the string of characters that makes up the sentence fragment into known tokens, such as words, punctuation marks, and special characters, based on a lexicon. The paraphrase processor 168 can align the sentence fragment by matching the tokens in the sentence fragments. Table 1 below provides an illustration of a possible alignment of the sentence fragments 404, 406.

TABLE 1

| Soviet troops | pulled out of | Afghanistan |
| Soviet troops | withdrew from | Afghanistan |

As shown in Table 1, the paraphrase engine 168 aligns like tokens in the pair of sentence fragments. For example, the word tokens "Soviet troops" and "Afghanistan" are aligned. By aligning the like tokens, the paraphrase engine 168 identifies a paraphrase pair from the dissimilar tokens of the sentence fragments. For the example shown in Table 1 above, the potential paraphrase pair is the two groups of dissimilar word tokens—"pulled out of" and "withdrew from".

In block 306, the paraphrase engine 168 determines whether the alignment of the sentence fragments meets a minimum threshold. A threshold may be used to determine the likelihood that the identified dissimilar tokens are a potential paraphrase pair. In one embodiment, the minimum threshold may be that at least three non-stop words in each of the two sentence fragments are aligned and that there is a minimum of five tokens in each group of dissimilar tokens. Examples of stop words are determiners, conjunctions, and words (relative adverbs) beginning with the letters "wh".

The example shown in Table 1 meets this minimum threshold. The number of non-stop words that aligned equals three, because the three non-stop word tokens "Soviet", "troops", and "Afghanistan" aligned. The number of tokens in the dissimilar group of tokens was less than five for both sentence fragments. For example, "pulled out of" is three tokens and "withdrew from" is two tokens.

If the alignment of the sentence fragments does not meet the minimum threshold, then the potential paraphrase pair is discarded in block 308. If the alignment of the sentence fragments does meet the minimum threshold, then the identified potential paraphrase pair is extracted in block 310. In one embodiment, the extracted potential paraphrase pair is added to a list of potential paraphrase pairs by the paraphrase engine 168. While FIG. 3 illustrates extracting one potential paraphrase pair from a single pair of sentence fragments, the paraphrase processor 168, in one embodiment, similarly processes pairs of sentence fragments for all or a portion of the information item index.

Returning again to FIG. 2, in block 204 the potential paraphrase pairs are grouped. A group may contain a single paraphrase pair or multiple paraphrase pairs. The potential paraphrase pairs may be grouped by the paraphrase engine 168 into groups of like potential paraphrase pairs. For example, all of the potential paraphrase pairs "pulled out of—withdrew from" are grouped together.

After the potential paraphrase pairs are grouped, a group of potential paraphrase pairs is identified for processing by the paraphrase engine 168 in block 206. An identified group is then compared with a minimum threshold in block 208. In one embodiment, the minimum threshold is based on the frequency of occurrence of the potential paraphrase pair. The frequency of occurrence can be determined by the number of paraphrase pairs in the group. In one embodiment, the minimum frequency for a potential paraphrase pair may be three. In this example, the paraphrase engine 168 determines whether the number of potential paraphrase pairs in a group is three or greater.

If the group of potential paraphrase pairs does not meet the minimum threshold, the group is discarded in block 210. If the group of potential paraphrase pairs does meet the minimum threshold, then the group is indexed in block 212. In one embodiment, the paraphrase engine 168 adds the potential paraphrase pair from the group to a paraphrase index. In one embodiment, the paraphrase index is located on storage device 180. A frequency of occurrence value can be associated with the paraphrase pair in the index. For example, if the paraphrase pair "pulled out of—withdrew from" has a frequency value of ten, meaning that it appeared in the list of potential paraphrase pairs ten times, a single entry for the paraphrase pair "pulled out of—withdrew from" may be included in the paraphrase index with the associated frequency value of ten.

After the group is discarded or indexed, in block 214, the paraphrase engine 168 determines if any more groups of potential paraphrase pairs need to be processed. If no more groups require processing, then method 200 stops at block 216. If more groups require processing, then method 200 returns to block 206 where another group of potential paraphrase pairs is identified for processing.

Alternatively, the paraphrase processor 168 may determine which potential paraphrase pairs to index based on the list of potential paraphrase pairs. In this embodiment, the paraphrase engine 168 may determine a frequency of occurrence value for all potential paraphrase pairs. The frequency value can be the number of times a potential paraphrase pair occurs in the list. The paraphrase engine 168 may then discard all paraphrase pairs that do not meet a minimum frequency value and extract and index all paraphrase pairs that meet the minimum frequency value. Similar to the example above, the frequency value can be associated with the paraphrase pair in the index. Alternatively, the paraphrase pair entries in the paraphrase index can be ranked based on their associated frequency value.

FIG. 5 shows an illustrative portion of a paraphrase index 500 according to one embodiment of the invention. The paraphrase index 500 contains a ranked list of paraphrase pairs. The paraphrase index may have a variety of different uses, such as in information retrieval, information extraction, automated question answering, and document summarization.

In information retrieval, the paraphrase index may be used to associate a paraphrase in the search request with matching paraphrases in the text of documents sought for retrieval. For example, if a web search query includes the phrase "withdrew from" a search engine 120 can access the paraphrase index and determine that "withdrew from" has an associated paraphrase "pulled out of". The search engine 120 can use this information to search for documents that match both "withdrew from" and "pulled out of" and the rest of the search terms. In question answering, a question may be a natural language search query. It is helpful to identify any paraphrases of words or phrases in the question to more fully identify the answer.

In information extraction, extraction patterns may be set up around certain types of tokens, such as verbs. It is therefore useful to identify paraphrases containing verbs so that useful information is not missed and is extracted. The paraphrase index may be used to identify paraphrases during the extraction of information.

In summarization of a document or text, key sentences can be identified as being useful in summarizing the content of the document or text. By being able to identify paraphrases, duplicative sentences that say the same thing but in a different way can be eliminated. The paraphrase index may also be used in other suitable ways.

General

While the above description contains many specifics, these specifics should not be construed as limitations on the scope of the invention, but merely as illustrations of the disclosed embodiments. Those skilled in the art will envision any other possible variations that are within the scope of the invention.

That which is claimed:

1. A system comprising:
one or more computers programmed to implement a paraphrase engine to create an index of paraphrases, paraphrases being groups of one or more words in a same language, the groups having a same or a similar meaning but not being identical, the paraphrase engine to perform operations including:
identifying a first sentence fragment and a second sentence fragment that, in text of one or more electronic documents, are both associated with a same date or entity name, the first sentence fragment and the second sentence fragment each comprising two or more like-words found in both the first sentence fragment and the second sentence fragment and one or more dissimilar-words found in only one of the first sentence fragment or the second sentence fragment;
aligning the like-words in the first sentence fragment with the like-words in the second sentence fragment;
determining that the alignment satisfies a threshold frequency value; and
in response to determining that the alignment satisfies the threshold frequency value, extracting the dissimilar-words from the first sentence fragment and the dissimilar-words from the second sentence fragment; and
outputting the index of paraphrases after the extracting, the index identifying the dissimilar-words from the first sentence fragment as paraphrasing the dissimilar-words from the second sentence fragment.

2. The system of claim 1, wherein the one or more computers are programmed to implement a search engine to perform operations, the operations comprising:
receiving web search queries that include the dissimilar-words from the second sentence fragment;
accessing the index of paraphrases;

determining, from the index of paraphrases, that the dissimilar-words from the first sentence fragment paraphrase the dissimilar-words from the second sentence fragment; and searching for electronic documents responsive to the web search queries using at least the dissimilar-words from the first sentence fragment paraphrase.

3. The system of claim 2, further comprising client devices programmed to submit the web search queries to the search engine.

4. The system of claim 1, wherein the first sentence fragment and the second sentence fragment are identified using one or more lexico-syntactic extraction patterns.

5. The system of claim 4, wherein the lexico-syntactic extraction patterns are set up to identify sentence fragments containing verbs.

6. The system of claim 1, wherein the one or more computers are further programmed to summarize a text or a document, including identifying duplicative sentences that say a same thing but in a different way.

7. The system of claim 1, wherein the operations further comprise determining that the alignment satisfies a criterion that embodies a likelihood that the dissimilar-words in the first sentence fragment are paraphrases of the dissimilar-words in the second sentence fragment.

8. The system of claim 7, wherein the criterion is a threshold requirement that at least three non-stop dissimilar-words in the first sentence fragment are aligned with three non-stop dissimilar-words in the second sentence fragment.

9. The system of claim 1, wherein the index of paraphrases further comprises a frequency of occurrence value that characterizes how often the dissimilar-words from the first sentence fragment paraphrase the dissimilar-words from the second sentence fragment.

10. The system of claim 1, wherein operations performed by the paraphrase engine further comprise:
generating a list of potential paraphrase pairs by repeatedly identifying sentence fragments that, in the text of one or more electronic documents, are both associated with a same date or entity name, aligning like-words in the sentence fragments, determining that the alignment satisfies the threshold frequency value, and, in response to determining that the alignment satisfies the threshold frequency value, extracting dissimilar-words from the sentence fragments;
determining a frequency at which the dissimilar-words extracted from the sentence fragments appear in the list of potential paraphrase pairs; and
discarding dissimilar-words that do not meet a threshold frequency value.

11. The system of claim 10, wherein the dissimilar-words extracted from the sentence fragments are ranked in the index of paraphrases according to the frequency at which the dissimilar-words extracted appear in the list of potential paraphrase pairs.

12. The system of claim 1, wherein the operations further comprise parsing the identified sentences fragments into words.

13. The system of claim 1, wherein the operations further comprise aligning special characters or punctuation marks in the first sentence fragment with special characters or punctuation marks in the second sentence fragment.

14. A method implemented by a system of one or more computers, the method comprising:
identifying, by the system, a first sentence fragment and a second sentence fragment that, in text of one or more electronic documents, are both associated with a same date or entity name, the first sentence fragment and the second sentence fragment each comprising two or more like-words found in both the first sentence fragment and the second sentence fragment and one or more dissimilar-words found in only one of the first sentence fragment or the second sentence fragment;
aligning, by the system, the like-words in the first sentence fragment with the like-words in the second sentence fragment;
determining, by the system, that the alignment satisfies a threshold frequency value; and
in response to determining that the alignment satisfies the threshold frequency value, extracting, by the system, the dissimilar-words from the first sentence fragment and the dissimilar-words from the second sentence fragment; and
outputting, to memory, the index of paraphrases after the extracting, the index identifying the dissimilar-words from the first sentence fragment as paraphrasing the dissimilar-words from the second sentence fragment.

15. The method of claim 14, further comprising:
receiving web search queries that include the dissimilar-words from the second sentence fragment;
accessing the index of paraphrases;
determining, from the index of paraphrases, that the dissimilar-words from the first sentence fragment paraphrase the dissimilar-words from the second sentence fragment; and
searching for electronic documents responsive to the web search queries using at least the dissimilar-words from the first sentence fragment.

16. The method of claim 14, wherein the first sentence fragment and the second sentence fragment are identified using one or more lexico-syntactic extraction patterns.

17. The method of claim 16, wherein the lexico-syntactic extraction patterns are set up to identify sentence fragments containing verbs.

18. The method of claim 14, further comprising summarize a text or a document, including identifying duplicative sentences that say a same thing but in a different way.

19. The method of claim 14, wherein the method further comprises determining, by the system, that the alignment satisfies a criterion that embodies a likelihood that the dissimilar-words in the first sentence fragment are paraphrases of the dissimilar-words in the second sentence fragment.

20. The method of claim 19, wherein the criterion is a threshold requirement that at least three non-stop dissimilar-words in the first sentence fragment are aligned with three non-stop dissimilar-words in the second sentence fragment.

21. The method of claim 14, further comprising:
generating a list of potential paraphrase pairs by repeatedly identifying sentence fragments that, in the text of one or more electronic documents, are both associated with a same date or entity name, aligning like-words in the sentence fragments, determining that the alignment satisfies the threshold frequency value, and, in response to determining that the alignment satisfies the threshold frequency value, extracting dissimilar-words from the sentence fragments;
determining a frequency at which the dissimilar-words extracted from the sentence fragments appear in the list of potential paraphrase pairs; and
discarding dissimilar-words that do not meet a threshold frequency value.

22. The method of claim 14, further comprising ranking the dissimilar-words extracted from the sentence fragments in the index of paraphrases according to the frequency at which the dissimilar-words extracted appear in the list of potential paraphrase pairs.

23. The method of claim 14, further comprising parsing the identified sentences fragments into words.

24. The method of claim 14, further comprising aligning special characters or punctuation marks in the first sentence fragment with special characters or punctuation marks in the second sentence fragment.

25. A method implemented by a system of one or more computers, the method comprising:
    identifying, by the system, different sentence fragments in different electronic documents, wherein the sentence fragments each comprise two or more words that are alike and are all associated within the different electronic documents with a same date, with a same entity name, or with a same concept, and wherein the sentence fragments further comprising words that are dissimilar and not found in all the sentence fragments;
    aligning, by the system, the different sentence fragments based on positioning of the words that are alike within the different sentence fragments;
    determining, by the system, that some of the alignments of the words that are alike satisfy a criterion;
    in response to determining that some of the alignments of the words that are alike satisfy the criterion, extracting, by the system, the words that are dissimilar from the at least some of the different sentence fragments;
    determining, by the system, frequencies at which the words that are dissimilar appear between the words that are alike within the different sentence fragments;
    determining, by the system, that some of the words that are dissimilar satisfy a threshold frequency value;
    in response to the determining that at least some of the words that are dissimilar satisfy the threshold frequency value, adding, by the system, the words that are dissimilar and that satisfy the threshold frequency value to an index of paraphrases; and
    outputting, by the system, the index of paraphrases after the adding, the index identifying that the words that are dissimilar and that satisfy the threshold frequency value are paraphrases, wherein paraphrases are groups of one or more words in a same language, the groups having a same or a similar meaning but not being identical.

26. The method of claim 25, wherein the method further comprises:
    determining, by the system, that some of the words that are dissimilar fail to satisfy the threshold frequency value; and
    discarding, by the system, the some of the words that are dissimilar and that fail to satisfy the threshold frequency value.

27. The method of claim 25, further comprising:
    receiving, by the system, web search queries that include words;
    accessing, by the system, the index of paraphrases;
    determining, by the system and from the index of paraphrases, that some of the words in the web search queries appear in the index of paraphrases; and
    searching for electronic documents responsive to the web search queries using other words that are identified in the index of paraphrases as paraphrasing the some of the words appearing in the web search queries.

28. The method of claim 25, wherein identifying the different sentence fragments in the different electronic documents comprises identifying the different sentence fragments using one or more lexico-syntactic extraction patterns.

29. The method of claim 28, wherein the lexico-syntactic extraction patterns are set up to identify sentence fragments containing verbs.

30. A system comprising:
    one or more computers programmed to implement a paraphrase engine to create an index of paraphrases, paraphrases being groups of one or more words in a same language, the groups having a same or a similar meaning but not being identical, the paraphrase engine to perform operations including:
        identifying different sentence fragments in different electronic documents, wherein the sentence fragments each comprise two or more words that are alike and are all associated within the different electronic documents with a same date, with a same entity name, or with a same concept, and wherein the sentence fragments further comprising words that are dissimilar and not found in all the sentence fragments;
        aligning the different sentence fragments based on positioning of the words that are alike within the different sentence fragments;
        determining that some of the alignments of the words that are alike satisfy a criterion;
        in response to determining that some of the alignments of the words that are alike satisfy the criterion, extracting the words that are dissimilar from the at least some of the different sentence fragments;
        determining frequencies at which the words that are dissimilar appear between the words that are alike within the different sentence fragments;
        determining that some of the words that are dissimilar satisfy a threshold frequency value;
        in response to the determining that at least some of the words that are dissimilar satisfy the threshold frequency value, adding the words that are dissimilar and that satisfy the threshold frequency value to an index of paraphrases; and
        outputting the index of paraphrases after the adding, the index identifying that the words that are dissimilar and that satisfy the threshold frequency value are paraphrases, wherein paraphrases are groups of one or more words in a same language, the groups having a same or a similar meaning but not being identical.

31. The system of claim 30, wherein the operations further comprise:
    determining that some of the words that are dissimilar fail to satisfy the threshold frequency value; and
    discarding the some of the words that are dissimilar and that fail to satisfy the threshold frequency value.

32. The system of claim 30, wherein the one or more computers are further programmed to implement a search engine, the search engine to perform operations including:
    receiving web search queries that include words;
    accessing the index of paraphrases;
    determining, from the index of paraphrases, that some of the words in the web search queries appear in the index of paraphrases; and
    searching for electronic documents responsive to the web search queries using other words that are identified in the index of paraphrases as paraphrasing the some of the words appearing in the web search queries.

33. The system of claim 30, wherein identifying the different sentence fragments in the different electronic documents comprises identifying the different sentence fragments using one or more lexico-syntactic extraction patterns.

34. The system of claim 33, wherein the lexico-syntactic extraction patterns are set up to identify sentence fragments containing verbs.

35. An article comprising one or more computer-readable data storage media storing program code operable to cause one or more machines to perform operations, the operations comprising:
- identifying different sentence fragments in different electronic documents, wherein the sentence fragments each comprise two or more words that are alike and are all associated within the different electronic documents with a same date, with a same entity name, or with a same concept, and wherein the sentence fragments further comprising words that are dissimilar and not found in all the sentence fragments;
- aligning the different sentence fragments based on positioning of the words that are alike within the different sentence fragments;
- determining that some of the alignments of the words that are alike satisfy a criterion;
- in response to determining that some of the alignments of the words that are alike satisfy the criterion, extracting the words that are dissimilar from the at least some of the different sentence fragments;
- determining frequencies at which the words that are dissimilar appear between the words that are alike within the different sentence fragments;
- determining that some of the words that are dissimilar satisfy a threshold frequency value;
- in response to the determining that at least some of the words that are dissimilar satisfy the threshold frequency value, adding the words that are dissimilar and that satisfy the threshold frequency value to an index of paraphrases; and
- outputting the index of paraphrases after the adding, the index identifying that the words that are dissimilar and that satisfy the threshold frequency value are paraphrases, wherein paraphrases are groups of one or more words in a same language, the groups having a same or a similar meaning but not being identical.

36. The article of claim 35, wherein the operations further comprise:
- determining, by the system, that some of the words that are dissimilar fail to satisfy the threshold frequency value; and
- discarding, by the system, the some of the words that are dissimilar and that fail to satisfy the threshold frequency value.

37. The article of claim 35, wherein the operations further comprise:
- receiving web search queries that include words;
- accessing, by the system, the index of paraphrases;
- determining, by the system and from the index of paraphrases, that some of the words in the web search queries appear in the index of paraphrases; and
- searching for electronic documents responsive to the web search queries using other words that are identified in the index of paraphrases as paraphrasing the some of the words appearing in the web search queries.

38. The article of claim 35, wherein identifying the different sentence fragments in the different electronic documents comprises identifying the different sentence fragments using one or more lexico-syntactic extraction patterns.

39. The article of claim 38, wherein the lexico-syntactic extraction patterns are set up to identify sentence fragments containing verbs.

40. An article comprising one or more computer-readable data storage media storing program code operable to cause one or more machines to perform operations implementing a paraphrase engine to create an index of paraphrases, paraphrases being groups of one or more words in a same language, the groups having a same or a similar meaning but not being identical, the operations comprising:
- identifying a first sentence fragment and a second sentence fragment that, in text of one or more electronic documents, are both associated with a same date or entity name, the first sentence fragment and the second sentence fragment each comprising two or more like-words found in both the first sentence fragment and the second sentence fragment and one or more dissimilar-words found in only one of the first sentence fragment or the second sentence fragment;
- aligning the like-words in the first sentence fragment with the like-words in the second sentence fragment;
- determining that the alignment satisfies a threshold frequency value; and
- in response to determining that the alignment satisfies the threshold frequency value, extracting the dissimilar-words from the first sentence fragment and the dissimilar-words from the second sentence fragment; and
- outputting the index of paraphrases after the extracting, the index identifying the dissimilar-words from the first sentence fragment as paraphrasing the dissimilar-words from the second sentence fragment.

41. The article of claim 40, wherein the operations further implement a search engine, the operations further comprising:
- receiving web search queries that include the dissimilar-words from the second sentence fragment;
- accessing the index of paraphrases;
- determining, from the index of paraphrases, that the dissimilar-words from the first sentence fragment paraphrase the dissimilar-words from the second sentence fragment; and
- searching for electronic documents responsive to the web search queries using at least the dissimilar-words from the first sentence fragment.

42. The article of claim 40, wherein the first sentence fragment and the second sentence fragment are identified using one or more lexico-syntactic extraction patterns.

43. The article of claim 42, wherein the lexico-syntactic extraction patterns are set up to identify sentence fragments containing verbs.

44. The article of claim 40, wherein the operations further comprise summarizing a text or a document, including identifying duplicative sentences that say a same thing but in a different way.

45. The article of claim 40, wherein the operations further comprise determining that the alignment satisfies a criterion that embodies a likelihood that the dissimilar-words in the first sentence fragment are paraphrases of the dissimilar-words in the second sentence fragment.

46. The article of claim 45, wherein the criterion is a threshold requirement that at least three non-stop dissimilar-words in the first sentence fragment are aligned with three non-stop dissimilar-words in the second sentence fragment.

47. The article of claim 40, wherein the index of paraphrases further comprises a frequency of occurrence value that characterizes how often the dissimilar-words from the first sentence fragment paraphrase the dissimilar-words from the second sentence fragment.

48. The article of claim 40, wherein operations performed by the paraphrase engine further comprise:

generating a list of potential paraphrase pairs by repeatedly identifying sentence fragments that, in the text of one or more electronic documents, are both associated with a same date or entity name, aligning like-words in the sentence fragments, determining that the alignment satisfies the threshold frequency value, and, in response to determining that the alignment satisfies the threshold frequency value, extracting dissimilar-words from the sentence fragments;

determining a frequency at which the dissimilar-words extracted from the sentence fragments appear in the list of potential paraphrase pairs; and discarding dissimilar-words that do not meet a threshold frequency value.

49. The article of claim 48, wherein the dissimilar-words extracted from the sentence fragments are ranked in the index of paraphrases according to the frequency at which the dissimilar-words extracted appear in the list of potential paraphrase pairs.

50. The article of claim 40, wherein the operations further comprise parsing the identified sentences fragments into words.

51. The article of claim 40, wherein the operations further comprise aligning special characters or punctuation marks in the first sentence fragment with special characters or punctuation marks in the second sentence fragment.

* * * * *